(12) United States Patent
Heusermann et al.

(10) Patent No.: US 7,757,949 B2
(45) Date of Patent: Jul. 20, 2010

(54) STRUCTURING OF TEMPORARY SYSTEMS

(75) Inventors: Knut Heusermann, Bad Schonborn (DE); Klaus Irle, Walldorf (DE); Walter G. Kienle, St. Leon-Rot (DE); Gordon Muehl, Oestringen (DE)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 12/477,439

(22) Filed: Jun. 3, 2009

(65) Prior Publication Data

US 2009/0236421 A1   Sep. 24, 2009

Related U.S. Application Data

(63) Continuation of application No. 11/612,420, filed on Dec. 18, 2006, now Pat. No. 7,566,005, and a continuation of application No. 10/306,892, filed on Nov. 27, 2002, now Pat. No. 7,168,619.

(51) Int. Cl.
*G06F 19/00* (2006.01)
*G06Q 30/00* (2006.01)
*G06Q 99/00* (2006.01)

(52) U.S. Cl. .................. 235/385; 235/375; 235/492; 707/1; 707/2; 707/102

(58) Field of Classification Search ............... 235/375, 235/385, 492; 707/1, 2, 102
See application file for complete search history.

(56) References Cited

U.S. PATENT DOCUMENTS

| | | | |
|---|---|---|---|
| 5,025,140 A | 6/1991 | Varley | |
| 5,237,679 A | 8/1993 | Wang et al. | |
| 5,291,583 A | 3/1994 | Bapat | |
| 5,398,336 A | 3/1995 | Tantry et al. | |
| 5,592,667 A | 1/1997 | Bugajski | |
| 5,724,577 A | 3/1998 | Exley et al. | |
| 5,737,732 A | 4/1998 | Gibson et al. | |
| 5,825,651 A | 10/1998 | Gupta et al. | |
| 5,832,471 A | 11/1998 | Fukui | |
| 5,845,287 A | 12/1998 | Henrion | |
| 5,956,688 A | 9/1999 | Kokubo et al. | |
| 5,982,889 A | 11/1999 | DeMont | |
| 6,313,745 B1 | 11/2001 | Suzuki | |
| 6,374,252 B1 | 4/2002 | Althoff et al. | |
| 6,427,123 B1 | 7/2002 | Sedlar | |
| 6,609,129 B1 | 8/2003 | Luh | |
| 6,898,792 B1 | 5/2005 | Burke | |
| 2001/0044791 A1 | 11/2001 | Richter et al. | |
| 2002/0120598 A1 | 8/2002 | Shadmon et al. | |
| 2002/0143667 A1 | 10/2002 | Ho | |
| 2002/0184210 A1 | 12/2002 | Khan | |
| 2002/0190862 A1 | 12/2002 | Berquist et al. | |
| 2003/0154191 A1 | 8/2003 | Fish et al. | |

OTHER PUBLICATIONS

Mortensen, et al., "Structuring as a Basis for Product Modeling," *Critical enthusiasm—Contributions to Design Science: A Festschrift for Mogens Myrup Andreasen on the Occasion of his 60$^{th}$ Birthday*, pp. 111-128, Dec. 17, 1999.

*Primary Examiner*—Michael G Lee
*Assistant Examiner*—Ali Sharifzada
(74) *Attorney, Agent, or Firm*—Fish & Richardson P.C.

(57) ABSTRACT

A method for structuring a temporary system includes receiving information obtained by interrogating a tag on an article and establishing a relationship between the article and one or more other articles in the temporary system based at least in part upon the information obtained by interrogating the tag. The information obtained by interrogating the tag regards the article.

20 Claims, 8 Drawing Sheets

STRUCTURING OF TEMPORARY SYSTEMS

CROSS-REFERENCE TO RELATED APPLICATIONS

This application is a continuation of, and claims the benefits of the priorities under 35 U.S.C. §120 of, U.S. application Ser. No. 11/612,420, filed Dec. 18, 2006, now U.S. Pat. No. 7,566,005 and U.S. application Ser. No. 10/306,892, filed Nov. 27, 2002, now U.S. Pat. No. 7,168,619, the contents of both of which are incorporated herein by reference.

BACKGROUND

This invention relates to structuring temporary systems.

The tagging of articles with computer-readable identifiers and information has provided great improvements in areas such as supply chain management, asset tracking and management, security and access control, transportation, toll collection, baggage handling, inventory control and management, healthcare, and consumer services. For example, bar codes can be used to track the storage and movement of objects ranging from foodstuffs to coupons. Radio frequency identification ("RFID") tags can be used to track individuals as they access restricted locations and services. Smart cards can be used to store insurance information, medical records, and phone accounts. Examples of computer-readable tags include active and passive RFID tags, integrated circuit ("IC") microprocessor cards and memory cards, optical memory cards, barcodes, tags, and smart cards.

SUMMARY

The present invention provides method and apparatus, including computer-program products, for structuring temporary systems. Temporary systems are collections of articles that are assembled for a specific, relatively short-term project. Articles are physical incarnations that are amenable to being tagged with a unique, computer-readable identifier. The articles in a temporary system can be owned and/or operated by distinct groups, such as distinct companies or distinct nations. Information regarding the articles can be stored on the articles themselves using tags. The stored information can include, e.g., information uniquely identifying the article, operational information regarding the operation of the article, and maintenance information regarding the maintenance of the article.

Structuring a system includes the characterization of relationships between the articles in the system. Examples of relationships between articles include hierarchical component/subcomponent relationships, positional relationships, functional relationships, equivalency relationships, other hierarchical relationships, temporal relationships, and process or data stream relationships.

Temporary systems can be rapidly structured by, e.g., automatically structuring the temporary system, structuring the system "on the fly" as articles (and the corresponding operational information) are received, and/or only reading a portion of the information from each tag.

In one aspect the invention includes a method for structuring temporary systems. The method can include receiving information obtained by interrogating a tag on an article and establishing a relationship between the article and one or more other articles in the temporary system based at least in part upon the characteristic obtained by interrogating the tag. The received information includes at least one characteristic and other data regarding the article.

Aspects of the invention can include one or more of the following features. Receiving the information can include receiving a category of the article. The relationship can be established, e.g., based at least in part upon the category of the article. The received information can include a unique identification of the article. The relationship can be established based solely upon information read by interrogating the tag.

Receiving the information can include receiving operational information describing an operational characteristic of the article. Establishing the relationship can include establishing the relationship based upon the operational characteristic of the article. For example, the relationship can be established based upon a supply consumed by the article or based upon an output produced by the article. As another example, the relationship can also be established by emulating another relationship between a second article and the one or more other articles. The emulated relationship can be, e.g., an operational relationship between the second article and the one or more other articles. The second article can be equivalent to the article. For example, an equivalent second article can be one of a same make as the article and a same model as the article. The second article can be similar to the article. For example, the similar second article can share operational characteristics with the article.

The relationship between the article and one or more other articles can be between a first entity's article owned or operated by a first entity and a second entity's article owned or operated by a second entity.

The established relationship can include a similarity relationship between the article and one or more other articles or an equivalency relationship between the article and one or more other articles. Establishing the relationship between the article and one or more other articles can include receiving functional information regarding the deployment of the article in the temporary system and establishing a functional relationship between the article and one or more other articles based on the received functional information.

In another aspect the invention includes a computer program product for structuring a system. The computer program product can be operable to cause a data processing apparatus to receive information regarding a first article from a tag attached to the first article, establish a first relationship identifying the common characteristic of the first article and the second article, identify a second relationship involving the second article and a third article in the system, and establish a third relationship emulating the second relationship. The information received from the tag can identify the first article as sharing a common characteristic with a second article in the system. The third relationship can involve the first article and the third article. The computer program product can be tangibly embodied in an information carrier.

Aspects of the invention can include one or more of the following features. The product can also cause the data processing apparatus to establish the first relationship between a first description of the first article and a second description of the second article. The first relationship can be established between a first data object describing the first article and a second data object describing the second article.

The product can also cause the data processing apparatus to receive information identifying the first article as equivalent to the second article. For example, the information identifying the first article as equivalent can identify the first article as being one of a same make and a same model as the second article. The product can be operable to cause the data processing apparatus to receive information identifying the first article as sharing a common operational characteristic with the second article.

The product can also cause the data processing apparatus to establish the third relationship emulating the second relationship to indicate that the first article operates jointly with the third article, or to establish the third relationship emulating the second relationship to indicate that the first article consumes the third article. The third relationship emulating the second relationship can also be established to indicate that the first article produces the third article, to indicate that the first article interacts with the third article, or to indicate that the first article interacts mechanically with the third article.

The product can also cause the data processing apparatus to receive additional information regarding the first article from the tag after the data processing apparatus has established the third relationship, and establish a fourth relationship involving the first article based on the received additional information. The product can also cause the data processing apparatus to identify the second relationship involving the second article and the third article in a temporary system.

The invention can be implemented to realize one or more of the following advantages. In some temporary systems, it may be important to structure the system as rapidly as possible. In cases like these, all of the electronically-accessible information that is readable from a tag need not be read. By stopping after only some of the information has been read, various relationships between the tagged article and other articles in the system can be established without the need for an extensive data transfer. This allows articles to be deployed almost immediately after receipt while structuring at least some of the temporary system.

Including information regarding the characteristics of an article that is to be introduced to a temporary system in an electronically-accessible tag mounted to the article has other advantages. For example, the transmission path of the information is guaranteed to follow the path of the tagged article since the tag is attached to the article. This makes it easier to ensure that the information is associated with the correct tagged article. Further, the information is ensured to arrive at a given interrogator simultaneously with the tagged article. This prevents delays where one of the operational information and the tagged article is received after the other.

The automated description of the additional relationships between the new article description and article descriptions in the temporary system also rapidly structures the temporary system and reduces the need for user input. Furthermore, automated structuring draws upon the knowledge base that has already been input into the system, thereby reducing the likelihood of error and ensuring uniformity in the descriptions of systems. Since automated structuring draws upon such an existing knowledge base, automated structuring, in effect, relies upon established characterizations of relationships without requiring explicit expression of the knowledge base rules or relationships by a user.

Moreover, since automated structuring can operate in conjunction with automated interrogation and data collection, the management of items is greatly simplified. These automated processes can provide a user such as a company with a relatively complete description of the deployment of resources in even short-term temporary systems. Describing the deployment of assets can allow the manager of a temporary system to increase productivity by providing information about asset allocation and use.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
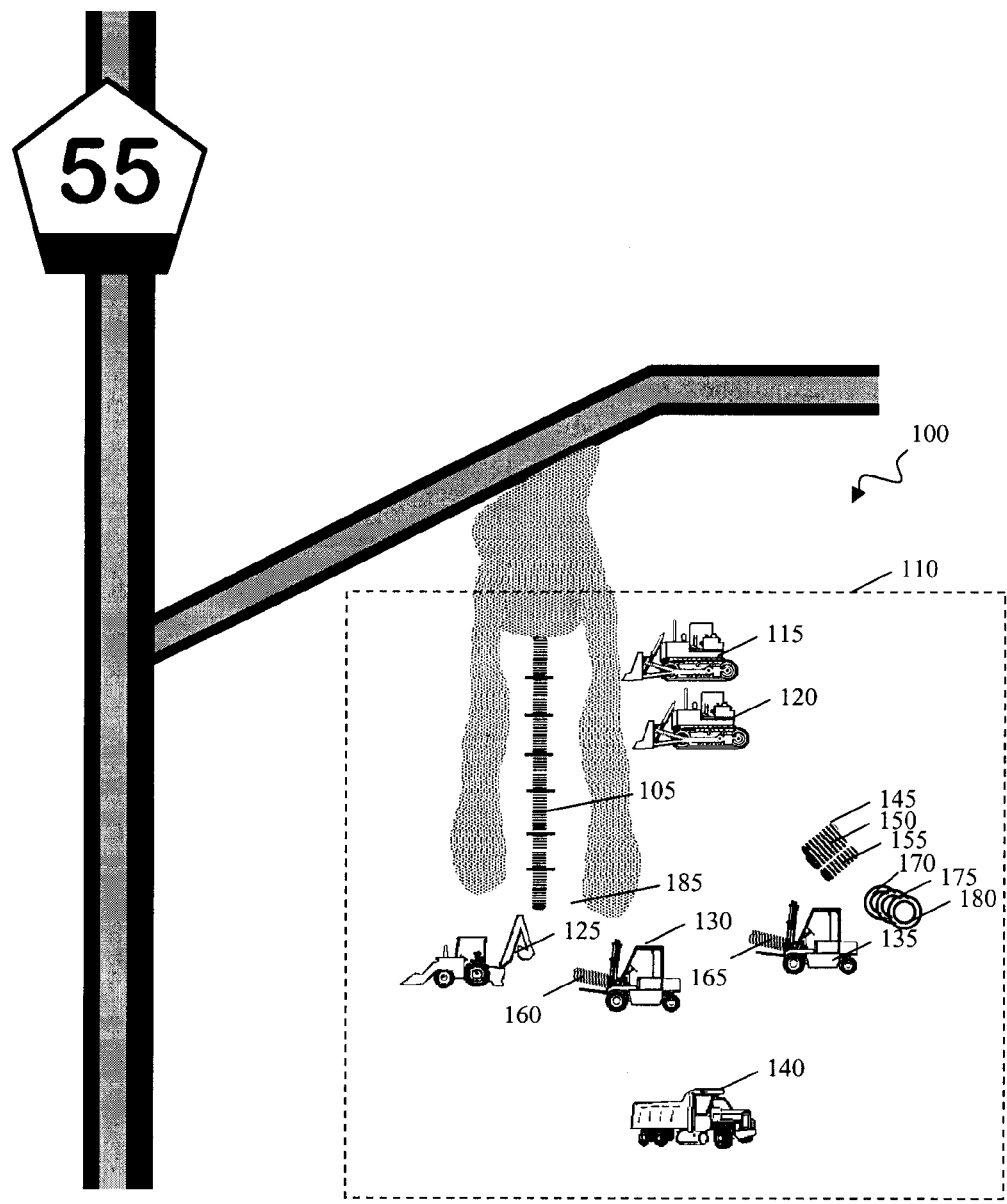
FIG. 1 shows an example of a temporary system assembled for a construction project.

FIG. 1 shows an example of a temporary system, namely a construction crew 100, that has been assembled to complete a construction project, namely to lay a pipe 105 at a construction site 110. Construction crew 100 includes various articles that play roles in the construction project. For example, construction crew 100 can include bulldozers 115, 120, backhoe 125, forklifts 130, 135, dump truck 140, unlaid pipe segments 145, 150, 155, 160, 165, and flanges 170, 175, 180. Bulldozers 115, 120 can cover pipe 105 after it has been laid in a ditch 185. Backhoe 125 can excavate ditch 185. Forklifts 130, 135 can transport unlaid pipe segments (e.g., unlaid pipe segments 160, 165) to ditch 185. Dump truck 140 can remove excess dirt excavated from ditch 185. Flanges 170, 175, 180 and unlaid pipe segments 145, 150, 155, 160, 165 can be attached to extend pipe 105.

The roles played by the articles in construction crew 100 can be described using different kinds of relationships between the articles. For example, a positional or geographic relationship between bulldozers 115, 120 can describe the common deployment of bulldozers 115, 120 at a particular location to cover pipe 105. Likewise, a functional relationship between forklifts 130, 135 can describe the shared deployment of forklifts 130, 135 to transport unlaid pipe segments 145, 150, 155, 160, 165. As another example, a structural relationship can describe the mechanical arrangement of flanges 170, 175, 180 and unlaid pipe segments 145, 150, 155, 160, 165 that extends pipe 105. Similarly, an operational relationship between forklifts 130, 135 and unlaid pipe segments 145, 150, 155, 160, 165 can describe the operational compatibility of forklifts 130, 135 and unlaid pipe segments 145, 150, 155, 160, 165. In particular, such an operational relationship can describe that forklifts 130, 135 are operable to transport unlaid pipe segments 145, 150, 155, 160, 165.

Figure 2:
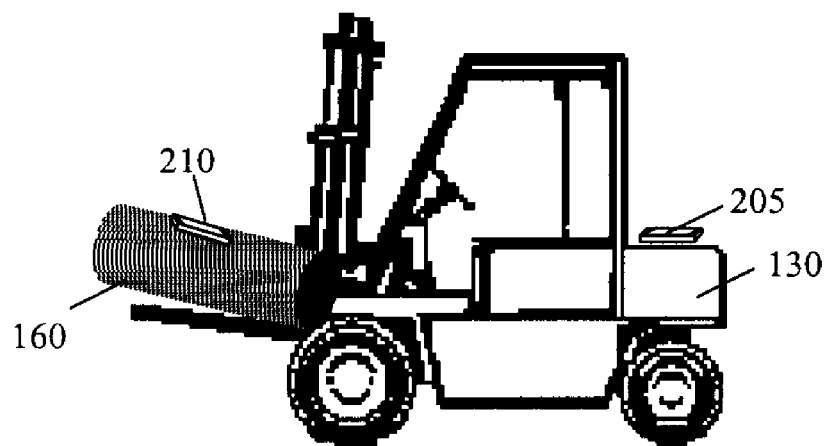
FIG. 2 shows how some articles in the temporary system can be tagged with electronically-accessible tags.
Figure 3:
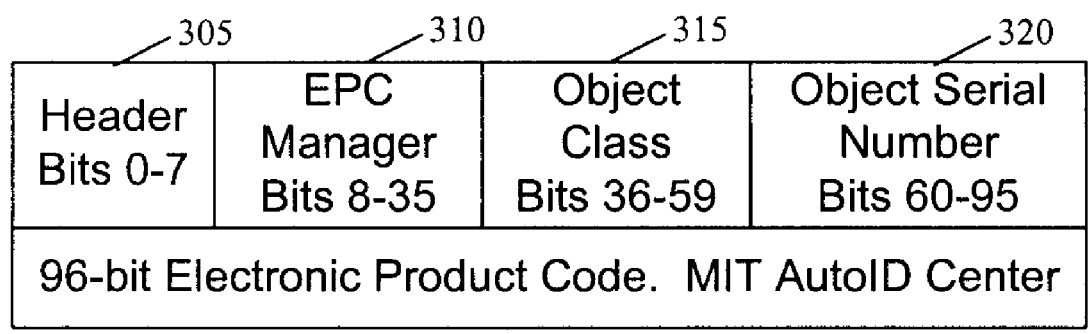
FIG. 3 shows an example of a format for data readable from the electronically-accessible tags.

Each of the articles in the temporary system of construction crew 100 can be tagged with an electronically-accessible tag. By way of example, FIG. 2 shows forklift 130 tagged with a tag 205 and unlaid pipe segment 160 tagged with a tag 210. Tags 205, 210 are electronically-accessible in that they store data in a machine-readable format. In particular, tags 205, 210 store a computer-readable globally unique identifier ("GUID") and a category identifier that identifies the category of the tagged article. One such machine-readable format is the Electronic Product Code ("ePC") of the MIT (Massachusetts Institute of Technology) AutoID Center. FIG. 3 illustrates the format of the ePC. The EPC is a 96 bit electronic product code that includes a header 305, manager bits 310, object class bits 315, and an object serial number 320. Manager bits 310 are used by a memory manager to manage memory. Object class bits 315 identify the category of the product described by the ePC and object serial number 320 uniquely identifies the product described by the ePC.

Tags such as tags 205, 210 can thus store a category identifier that identifies a category of the respective item. Table 1 includes example categories for tags such as tags 205, 210. Categories such as "Alpha Forklift" can identify, e.g., that the category of the tagged article is a forklift made by company "Alpha" or that the category of the tagged article is a forklift of model "Alpha."

TABLE 1

| CATEGORY |
| --- |
| Alpha Bulldozer |
| Alpha Forklift |
| Baker Forklift |
| Baker Backhoe |
| Charlie Backhoe |
| Pipe |
| Flange |

Tags such as tags 205, 210 can be, e.g., active and passive RFID tags, integrated circuit ("IC") microprocessor cards and memory cards, optical memory cards, barcodes, molecular tags, smart cards, or other computer-readable storage devices that include information relating to the identification of various articles. Tags such as tags 205, 210 can also include a processor to process data.

The data on tags, such as tags 205, 210, is electronically-accessible in that it can be read and converted into electronic format by a tag interrogator (not shown). Tag interrogators can be any device capable of reading from a tag (e.g., tags 205, 210) such as, e.g., optical scanners, transceivers, molecular readers, card readers, card-accepting devices, or other devices for reading data. Tag interrogators may also be operable to write to a given tag as part of the interrogation. Tag interrogators can include a data processor capable of structuring a temporary system, as discussed further below. Tag interrogators can also be interfaced with a computer or other data processing device capable of structuring a temporary system.

Figure 4:
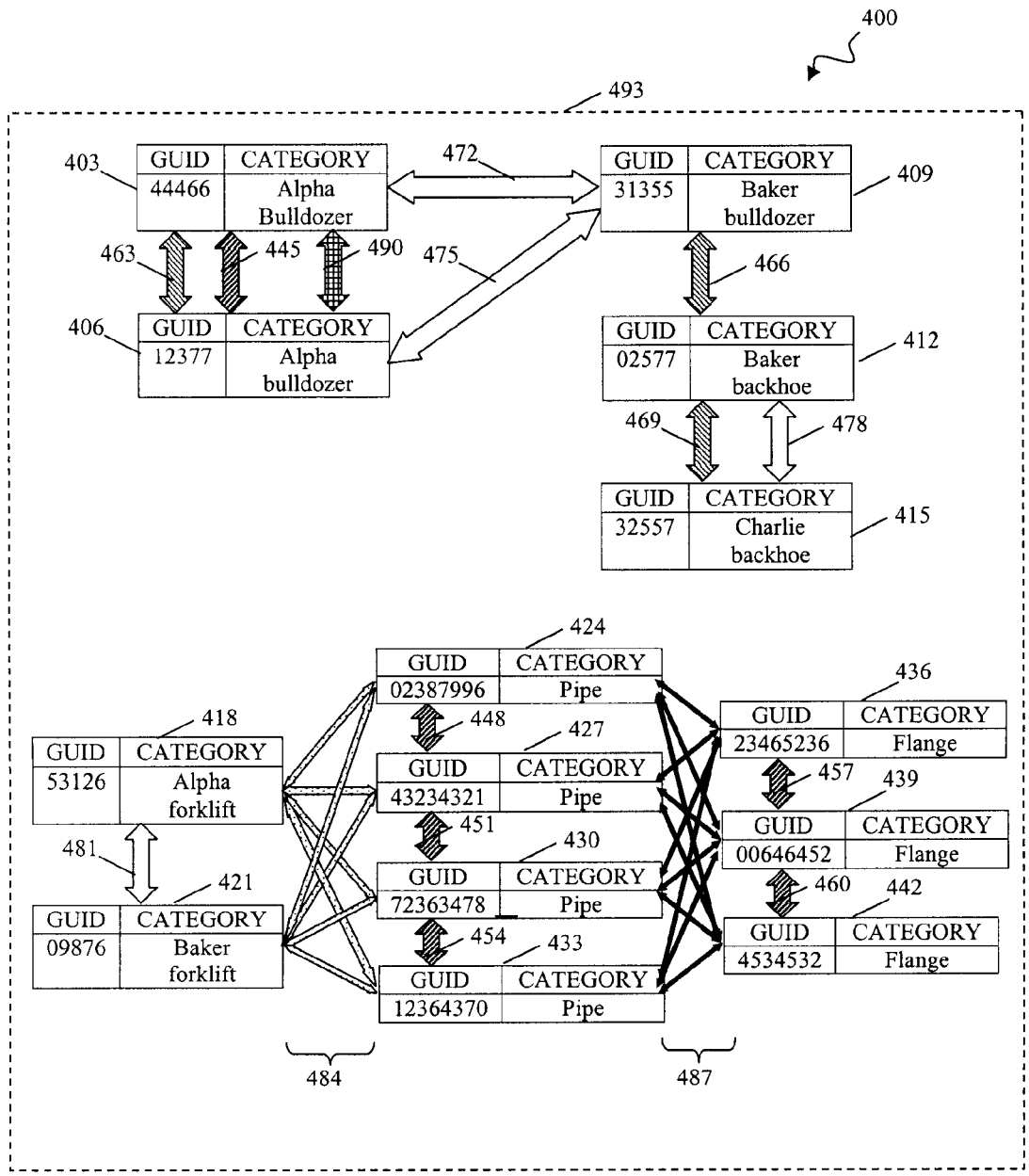
FIG. 4 shows an example structuring of a temporary system.

FIG. 4 shows an example of how an example temporary system 400 that includes descriptions of tagged articles (e.g., data objects) can be structured by describing the relationships between the articles. The descriptions of articles in system 400 include bulldozer objects 403, 406, 409, backhoe objects 412, 415, forklift objects 418, 421, pipe objects 424, 427, 430, 433, and flange objects 436, 439, 442. Bulldozer objects 403, 406 describe bulldozers belonging to a first category "Alpha bulldozer." Bulldozer object 409 describes a bulldozer belonging to a second category "Baker bulldozer." Backhoe object 412 describes a backhoe belonging to a first category "Baker backhoe." Backhoe object 415 describes a backhoe belonging to a second category "Charlie backhoe." Forklift object 418 describes a forklift belonging to a first category "Alpha forklift." Forklift object 421 describes a forklift belonging to a second category "Baker forklift." Pipe objects 424, 427, 430, 433 all describe portions of pipe belonging to a single category, and flange objects 436, 439, 442 all describe flanges belonging to a single category.

The descriptions of articles in system 400 are structured by describing relationships between the articles. In particular, an equivalency relationship 445 between bulldozer objects 403, 406 indicates that the bulldozers described by bulldozer objects 403, 406 are equivalent on some level. For example, equivalency relationship 445 can indicate that the bulldozers described by bulldozer objects 403, 406 are of the same make or model, or that the bulldozers described by bulldozer objects 403, 406 are operationally interchangeable.

Equivalency relationships 448, 451, 454 indicate that the individual pieces of pipe described by pipe objects 424, 427, 430, 433 are equivalent on some level, and equivalency relationships 457, 460 indicate that the individual flanges described by flange objects 436, 439, 442 are equivalent on some level. For example, equivalency relationships 448, 451, 454, 457, 460 can indicate that the related items are of the same make or model, or that the related items are operationally interchangeable.

A functional relationship 463 between bulldozer objects 403, 406 indicates that the bulldozers described by bulldozer objects 403, 406 share a common functional deployment in system 400. For example, the bulldozers described by bulldozer objects 403, 406 can be commonly deployed to cover a piece of pipe. Functional relationships 466, 469 between bulldozer object 409 and backhoe objects 412, 415 indicate that the bulldozer and backhoes described by objects 409, 412, 415 share a common functional deployment in system 400.

A similarity relationship 472 between bulldozer object 403 and bulldozer object 409 indicates that the bulldozers described by bulldozer objects 403, 409 share common characteristics but are not equivalent. For example, the bulldozer described by bulldozer object 403 may be a different make or model from the bulldozer described by bulldozer object 409 or may have slightly different operational capabilities. Similarly, a similarity relationship 475 exists between the bulldozers described by bulldozer objects 406, 409, a similarity relationship 478 exists between the backhoes described by backhoe objects 412, 415, and a similarity relationship 481 exists between the forklifts described by forklift objects 418, 421. The common characteristics indicated by similarity relationships 472, 475, 478, 481 can be, e.g., shared operational capabilities.

Operational relationships 484 between forklift objects 418, 421 and pipe objects 424, 427, 430, 433 indicate that the forklifts described by forklift objects 418, 421 can operate jointly with the portions of pipe described by pipe objects 424, 427, 430, 433. For example, operational relationships 484 can indicate that the forklifts described by forklift objects 418, 421 can safely transport the portions of pipe described by pipe objects 424, 427, 430, 433. Other operational relationships can indicate other operational features. For example, an operational relationship can indicate that one article is a workpiece of another article, that one article is consumed by another article, or that one article is produced and output by another article.

Structural relationships 487 between pipe objects 424, 427, 430, 433 and flange objects 436, 439, 442 indicate that the sections of pipe described by pipe objects 424, 427, 430, 433 can structurally interact with the flanges described by flange objects 436, 439, 442. For example, structural relationships 487 can indicate that the sections of pipe described by pipe objects 424, 427, 430, 433 can be mechanically joined by the flanges described by flange objects 436, 439, 442 to form a longer pipe (not shown). Other structural relationships can indicate other structural interactions between articles. For example, structural relationships can indicate potential or extant mechanical interactions, chemical interactions, or electrical interactions between articles in a temporary system. Structural relationships can also identify hierarchical relationships between articles in a temporary system.

A positional relationship 490 between bulldozer objects 403, 406 indicates that the bulldozers described by bulldozer objects 403, 406 are located at a same position. For example, the bulldozers described by bulldozer objects 403, 406 may be deployed at the same location to cover a piece of pipe. Other positional relationships may indicate, e.g., the relative location of an article in a manufacturing or assembly line, or in a process flow.

A system relationship 493, shown for the sake of clarity as a dashed box, indicates that bulldozer objects 403, 406, 409, backhoe objects 412, 415, forklift objects 418, 421, pipe objects 424, 427, 430, 433, and flange objects 436, 439, 442 all play roles in the project addressed by temporary system 400. Other system relationships may indicate, e.g., that articles are components of a more complex article or members of a subsystem within temporary system 400.

None of the articles described by bulldozer objects 403, 406, 409, backhoe objects 412, 415, forklift objects 418, 421, pipe objects 424, 427, 430, 433, and flange objects 436, 439, 442 need be owned or operated by a single entity. For example, the bulldozer described by bulldozer object 403 can be owned and operated by a first company, while the bulldozer described by bulldozer object 406 can be owned and operated by a second company. However, the bulldozer articles can be incorporated into temporary system 400 by establishing system relationship 493 and other relationships. Articles can also be owned or operated by different individuals, governmental agencies, or even nation states and still incorporated into system 400. For example, military equipment deployed by several nations for a military operation can be incorporated into temporary system by establishing relationships amongst the articles of military equipment.

Figure 5:
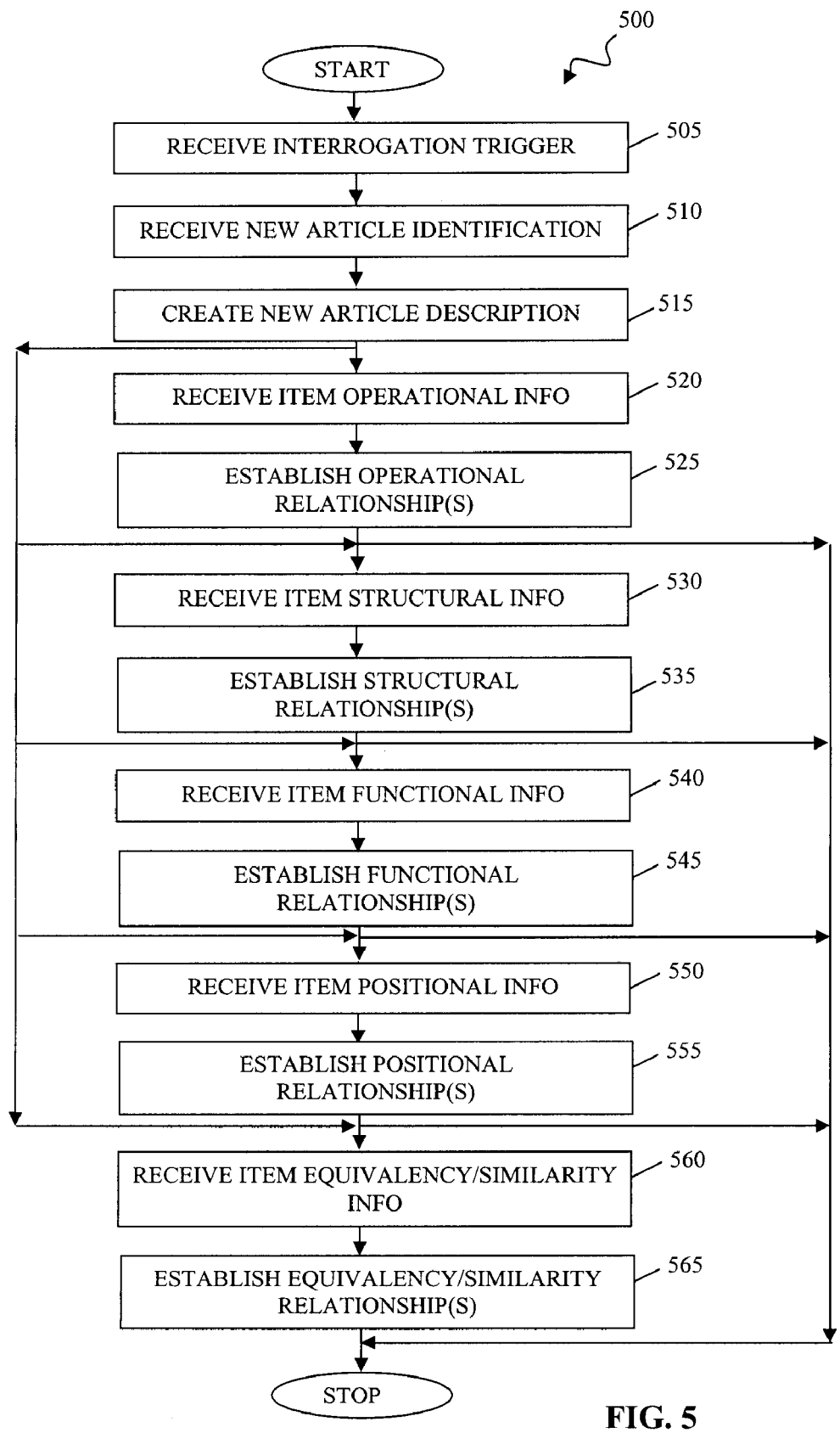
FIG. 5 show a method for the introduction of an object describing a new article into a temporary system.

FIG. 5 shows a method 500 for introducing an object describing a new, tagged article into a temporary system such as system 400. Method 500 can be performed, e.g., by a tag interrogator or other data processing system that receives information from an electronically-accessible tag mounted to the new article to be introduced into the temporary system.

The data processing system performing method 500 first receives an interrogation trigger indicating that data is to be read from the electronically-accessible tag mounted to the new article (step 505). The trigger can be generated manually by a human user or the trigger can be generated automatically, for example, when the tag interrogator identifies the presence of the tag. For example, a user can trigger the interrogation of a tag when the tagged article arrives at a particular location such as construction site 110.

The data processing system performing method 500 then receives information identifying the new article from the triggered interrogation (step 510). The identification information can be, e.g., a GUID assigned to the article and readable from the tag. The GUID can be used by the system to establish that the identified article is new to the temporary system. Upon receipt of the information identifying the new article, the system performing method 500 can create a new article description (e.g., a new data object) specifically for the new article (step 515). The new article description can be populated with data read from the tag or retrieved from a separate database, as appropriate.

The data processing system can also receive operational information regarding the operational characteristics of the new article (step 520). Operational information can be received, e.g., as a description of the category of the item or as additional electronically-accessible information on the tag. Alternatively, the received new item identification can be used to retrieve operational information regarding the new article from a separate database.

Using the received operational information, the system performing method 500 can establish one or more operational relationships between the new article description and other article descriptions in a temporary system (step 525). The operational and other relationships can be established, e.g., using approaches such as populating relationship fields in tables, creating pointers or other links between data objects, and populating relationship tables that describe the relationships between articles in a temporary system.

In some temporary systems, it may be important to structure the system as rapidly as possible. In cases like these, the operational information can be read directly from the electronically-accessible tag mounted to the new article, and method 500 can stop. By stopping after only operational information has been received, various relationships between the tagged article and other articles in the system can be established without the need for an extensive data transfer. This allows articles to be deployed almost immediately after receipt while providing at least limited structuring to the temporary system.

The data processing system performing method 500 can also receive structural information regarding the structural characteristics of the new article (step 530). Structural information can be received, e.g., as a description of the category of the item or as additional electronically-accessible information on the tag. Alternatively, the received new item identification can be used to retrieve structural information regarding the new article from a separate database.

Using the received structural information, the system performing method 500 can establish one or more structural relationships between the new article description and other article descriptions in the temporary system (step 535). Once again, to minimize the amount and duration of data transfer, structural information can be read directly from the electronically-accessible tag mounted to the new article, and method 500 can stop. By stopping after structural information has been received, various relationships between the tagged article and other articles in the system can be established without the need for an extensive data transfer.

The data processing system performing method 500 can also receive functional information regarding the functional characteristics of the new article (step 540). Functional information can be received, e.g., as electronically-accessible information on the tag or from a user who assigns the new article to a deployment in the temporary system. Alternatively, the received new item identification can be used to retrieve functional information regarding the new article from a separate database.

Using the received functional information, the system performing method 500 can establish one or more functional relationships between the new article description and other article descriptions in the temporary system (step 545). Once again, to minimize the amount and duration of data transfer, functional information can be received and method 500 can stop. By stopping after functional information has been received, various relationships between the tagged article and other articles in the system can be established without the need for an extensive data transfer.

The data processing system performing method 500 can also receive positional information regarding the functional characteristics of the new article (step 550). Positional information can be received, e.g., from a user who is assigning the new tagged article to a deployment position or deduced from the current position of the tag interrogator. For example, the current position of the tag interrogator can be received automatically from a positioning system such as the global positioning system (GPS) or by fixing the tag interrogator at a known location.

Using the received positional information, the system performing method 500 can establish one or more positional relationships between the new article description and other article descriptions in the temporary system (step 555). Once again, to minimize the amount and duration of data transfer, positional information can be received and method 500 can stop. By stopping after positional information has been received, various relationships between the tagged article and other articles in the system can be established without the need for an extensive data transfer.

The data processing system performing method 500 can also receive equivalency/similarity information regarding the equivalency/similarity characteristics of the new article (step 560). Equivalency/similarity information can be received, e.g., as a description of the category of the item or as additional electronically-accessible information on the tag. Alternatively, the received new item identification can be used to retrieve equivalency/similarity information regarding the new article from a separate database.

Using the received equivalency/similarity information, the system performing method 500 can establish one or more functional relationships between the new article description and other article descriptions in the temporary system (step 565). Once again, to minimize the amount and duration of data transfer, equivalency/similarity information can be read directly from the electronically-accessible tag mounted to the new article, and method 500 can stop. By stopping after equivalency/similarity information has been received, various relationships between the tagged article and other articles in the system can be established without the need for an extensive data transfer.

Figure 6:
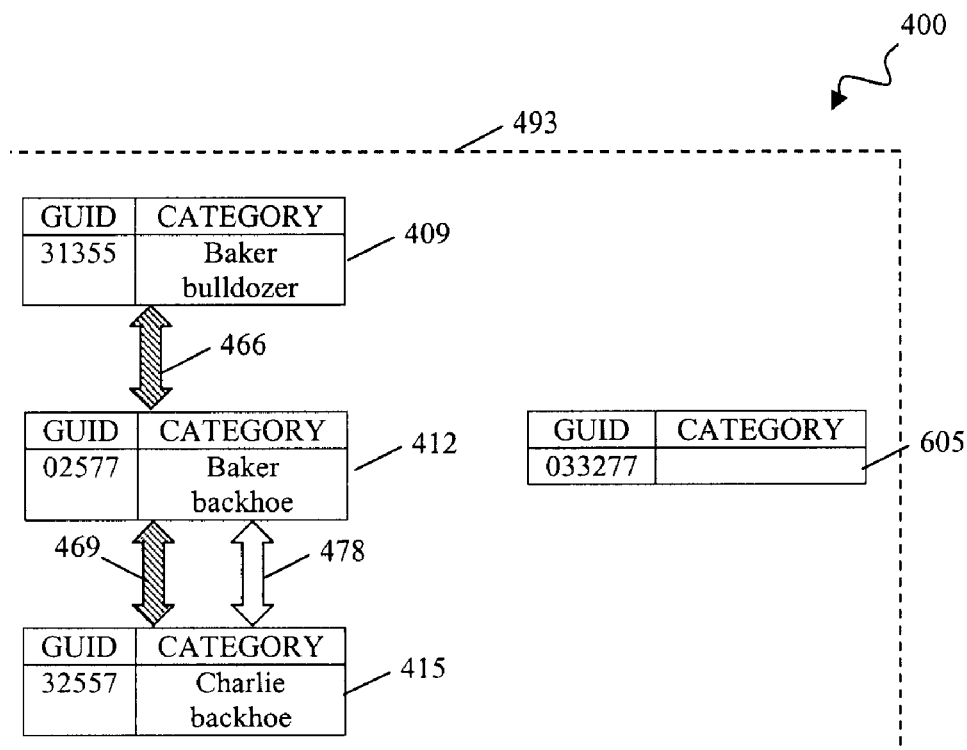
FIGS. 6-7 show one example of how the method of FIG. 5 introduces an object describing a new article into a temporary system.
Figure 7:
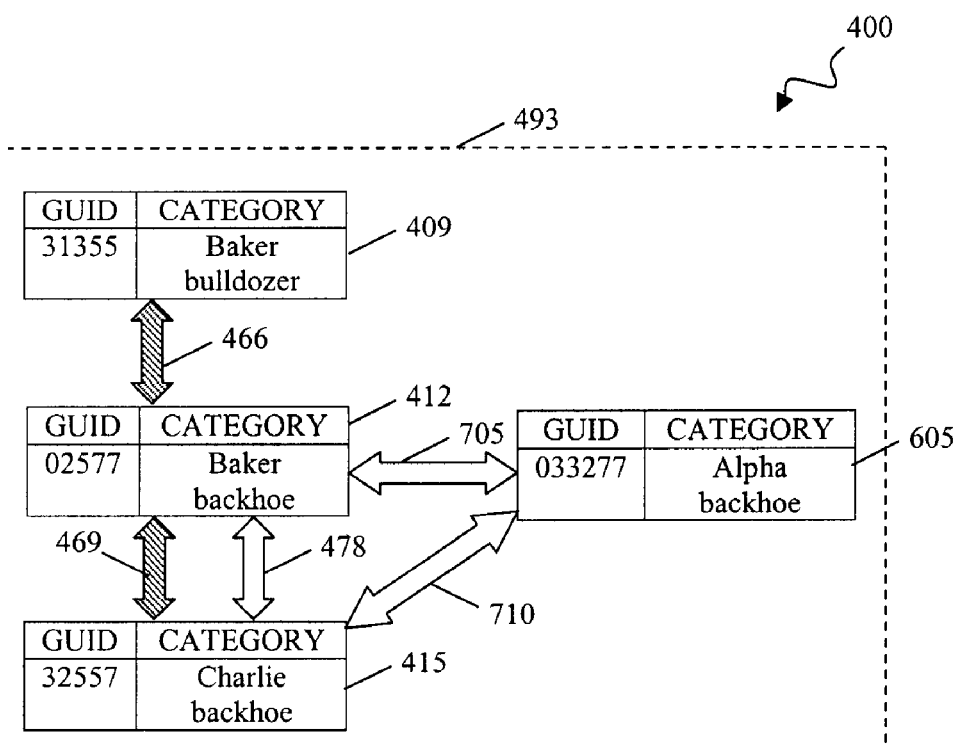

FIGS. 6-7 show one example of how method 500 introduces an object 605 describing a new, tagged article into construction crew 100. In particular, as shown in FIG. 6, the data processing system performing method 500 receives an interrogation trigger and identification information identifying the new article as GUID "033277." The system creates data object 605 that describes the new article. Data object 605 can be created within system relationship 493 that describes that data object 605 is to be included in construction crew 100.

As shown in FIG. 7, the data processing system can also receive a description of the category of the new article, namely that the new article belongs to category "Alpha backhoe." Such category information can act as similarity information for use in establishing similarity relationships with other descriptions of objects in construction crew 100. For example, the category information can be used to establish similarity relationships 705, 710 that indicate that the backhoe described by data object 605 is similar to the backhoes described by backhoe objects 412, 415. In particular, similarity relationships 705, 710 can indicate that the backhoe described by data object 605 shares common operational characteristics with but is not equivalent to the backhoes described by backhoe objects 412, 415.

Figure 8:
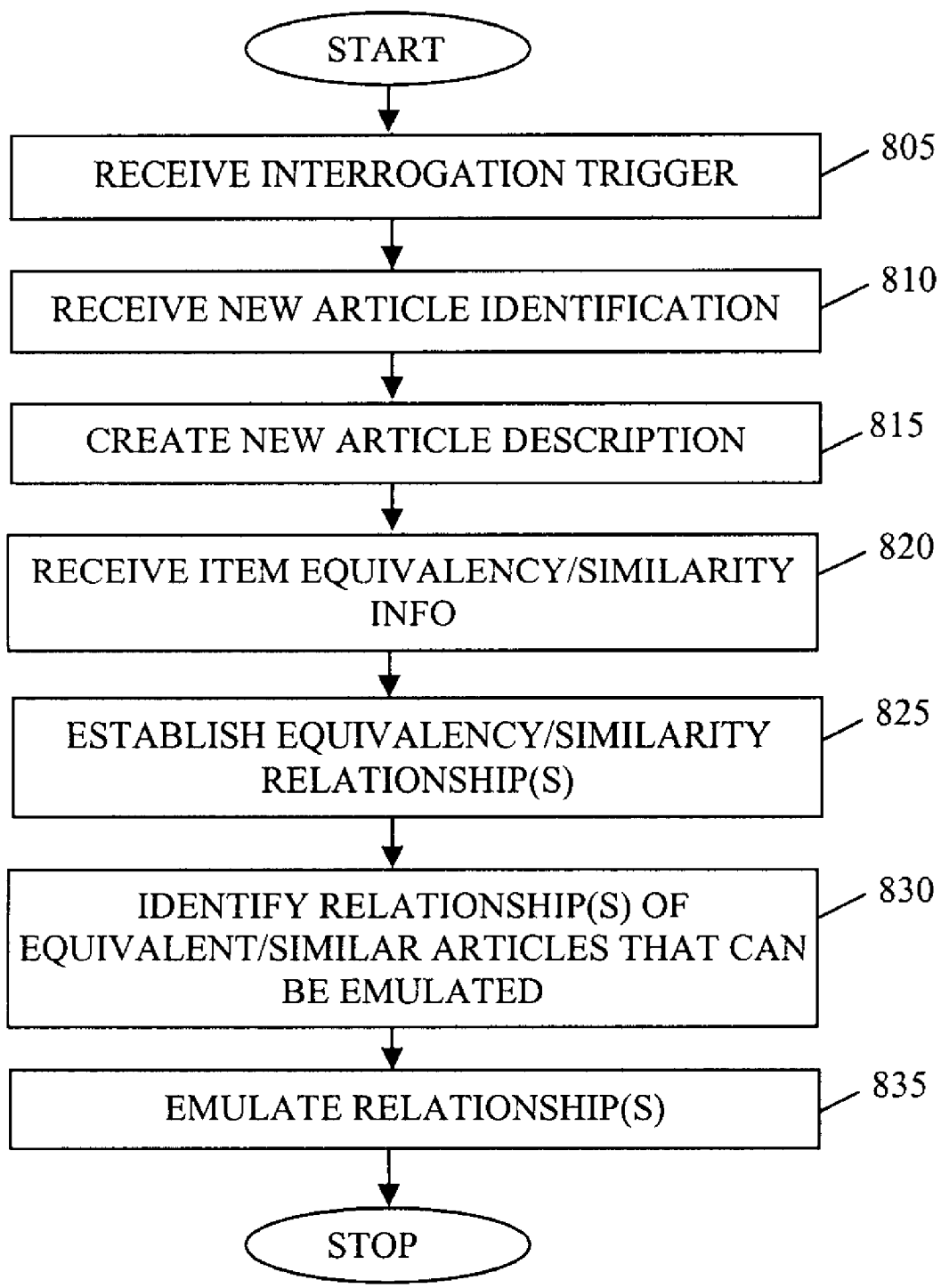
FIG. 8 shows a method for the introduction of an object describing a new article into a temporary system.

FIG. 8 shows a method 800 for introducing an object describing a new, tagged article into a temporary system. In particular, method 800 is directed to the rapid and automated establishment of operational, structural, functional, and other relationships. Method 800 can be performed, e.g., by a tag interrogator or other data processing system that receives information from an electronically-accessible tag mounted to the new article to be introduced into the temporary system.

The data processing system performing method 800 first receives an interrogation trigger indicating that data is to be read from the electronically-accessible tag mounted to the new article (step 805). The data processing system performing method 800 then receives information identifying the new article from the triggered interrogation (step 810). The identification information can be, e.g., a GUID assigned to the article and readable from the tag. Upon receipt of the information identifying the new article, the system performing method 800 can create a new article description (e.g., a new data object) specifically for the new article (step 815).

The data processing system performing method 800 can also receive equivalency/similarity information regarding the equivalency/similarity characteristics of the new article (step 820). Equivalency/similarity information can be received, e.g., as a description of the category of the item or as additional electronically-accessible information on the tag. Alternatively, the received new item identification can be used to retrieve equivalency/similarity information regarding the new article from a separate database. Using the received equivalency/similarity information, the system performing method 800 can then establish one or more equivalency/similarity relationships between the new article description and equivalent or similar article descriptions (step 825).

The system performing method 800 can also identify relationships between the equivalent or similar article descriptions and still other article descriptions in the temporary system that can be emulated (step 830). Relationships that can be emulated are those that can used by the system performing method 800 to describe additional relationships between the new article description and other article descriptions in the temporary system. For example, an operational relationship that indicates that one article in the temporary system can work jointly with the equivalent or similar article can be emulated. As another example, an operational relationship that describes that one article in the temporary system is a workpiece of the equivalent or similar article can be emulated. As another example, an operational relationship that describes that one article in the temporary system is consumed by the equivalent or similar article can be emulated. As yet another example, an operational relationship that describes that one article in the temporary system is produced by the equivalent or similar article can be emulated.

The system performing method 800 can then emulate the identified relationships (step 835). Emulating the identified relationships involves establishing a relationship between the new article description and the other article descriptions that corresponds to a relationship that already exists between the located article similar/equivalent descriptions and the other article descriptions. The copying of the identified relationships can be performed in an automated manner, i.e., without human intervention or approval of the emulation at the time of emulation.

If needed, the remainder of the information available on the electronically-accessible tag mounted to the new article can be read at a later time and used to establish additional relationships between the "new" article description and other article descriptions. However, by establishing at least some relationships after only a relatively small amount of data has been read from the tag and transferred to the data processing system performing method 800, the temporary system can be structured rapidly.

Figure 9:
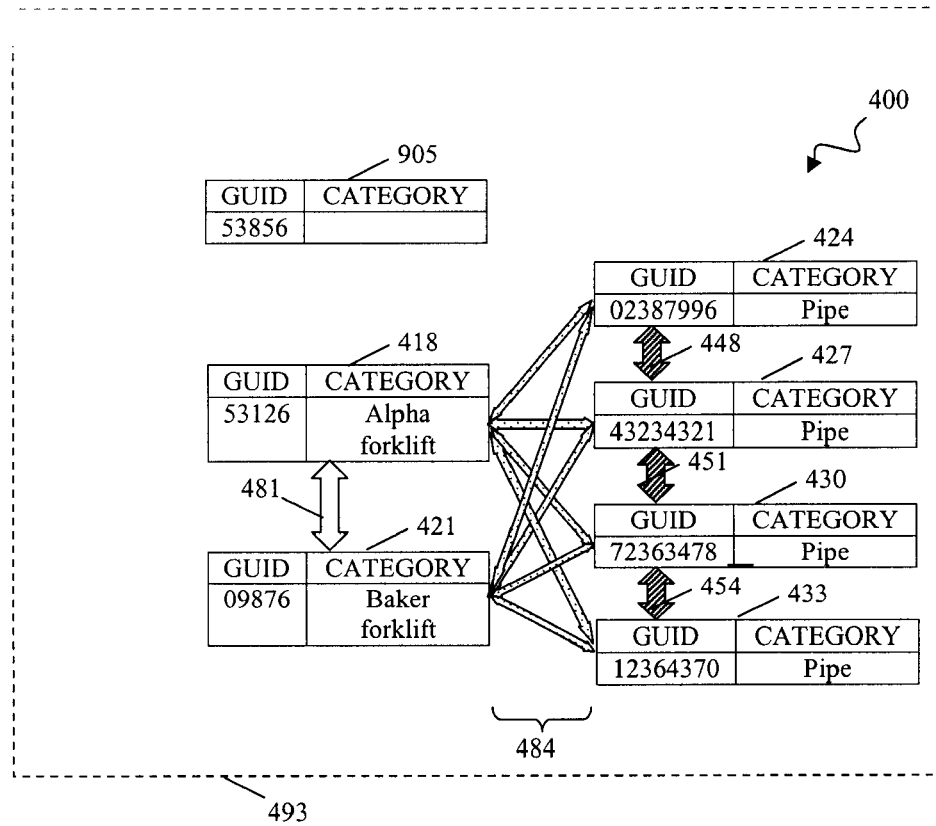
FIGS. 9-11 show one example of how the method of FIG. 8 introduces an object describing a new article into a temporary system.
Figure 10:
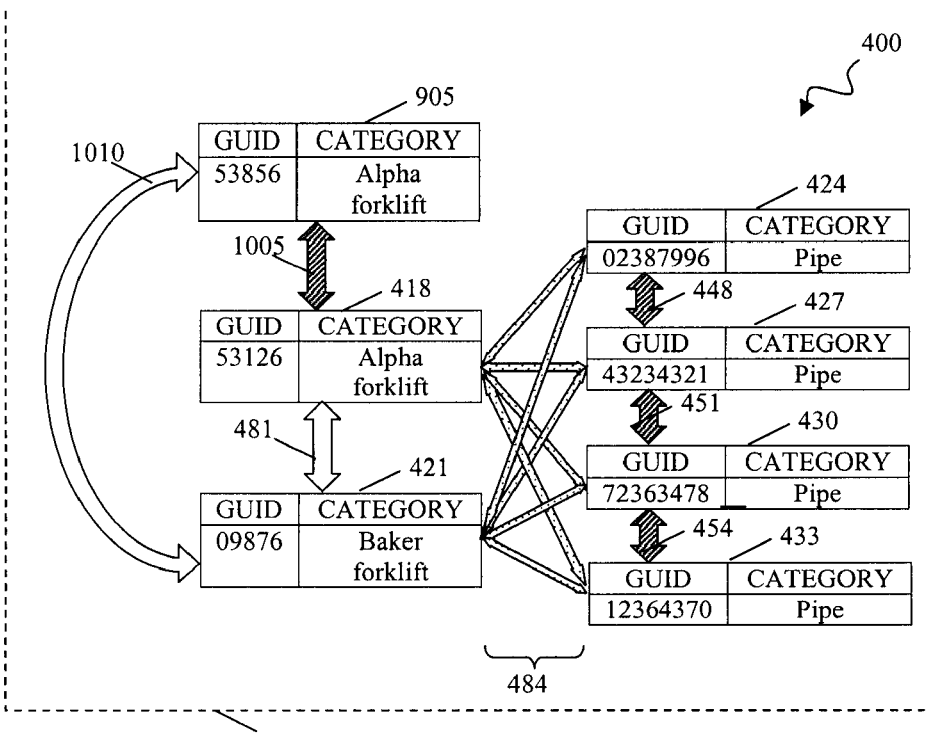
Figure 11:
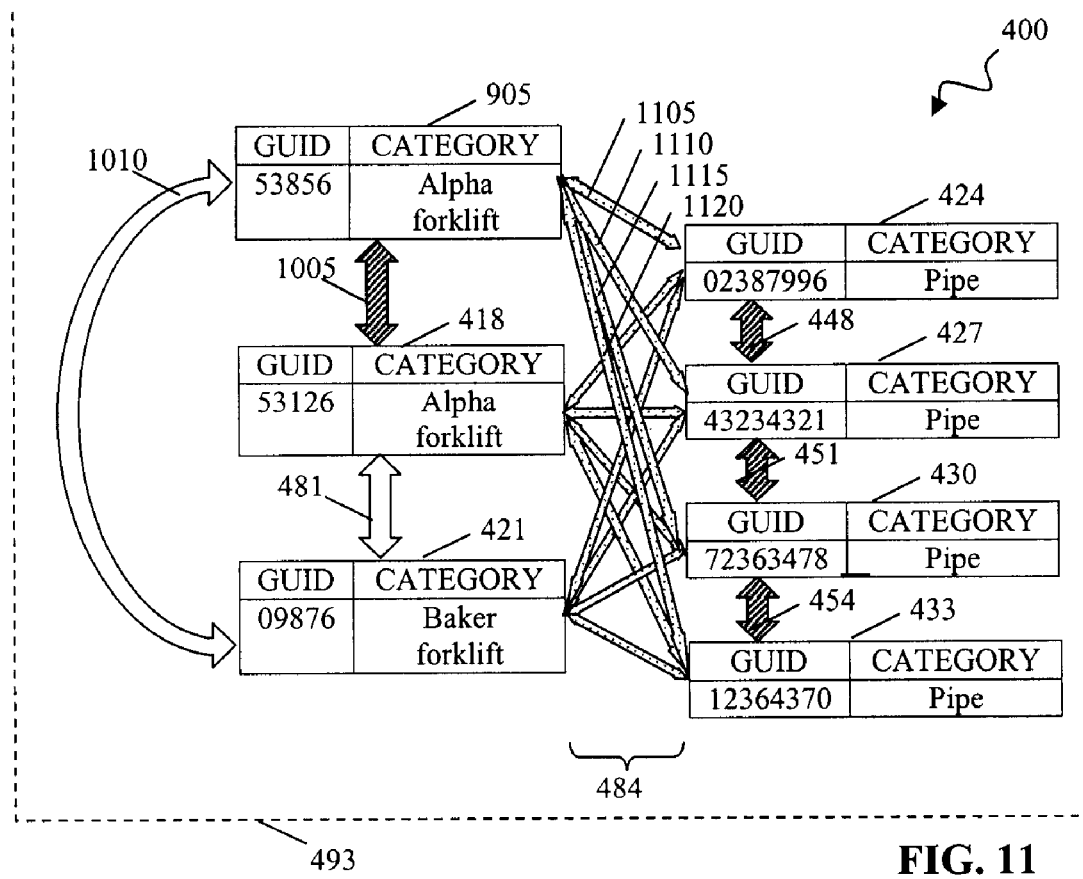

FIGS. 9, 10, and 11 show one example of how method 800 (FIG. 8) introduces an object 905 describing a new, tagged article into construction crew 100 (FIG. 1). In particular, as shown in FIG. 9, the data processing system performing method 800 receives an interrogation trigger and identification information identifying the new article as GUID "53856." The system creates data object 905 that describes the new article. Data object 905 can be created within system relationship 493 that describes that data object 905 is included in construction crew 100.

As shown in FIG. 10, the data processing system can also receive a description of the category of the new article, namely that the new article belongs to category "Alpha forklift." Such category information can act as similarity information for use in establishing one or more equivalency relationships and similarity relationships with other articles in construction crew 100. For example, the category information can be used to establish equivalency relationship 1005 that indicates that the forklift described by data object 905 is operationally equivalent to the forklift described by forklift object 418. As another example, the category information can be used to establish similarity relationship 1010 that indicates that the forklift described by data object 905 is operationally similar to the forklift described by forklift object 421.

As shown in FIG. 11, the data processing system can also identify and emulate relationships that exist between article descriptions 418, 421 and other article descriptions in the temporary system. For example, the data processing system can identify relationships 484, which indicate that the forklifts described by forklift objects 418, 421 can operate jointly with the portions of pipe described by pipe objects 424, 427, 430, 433, as capable of being emulated. The data processing system can then establish relationships 1105, 1110, 1115, 1120 that emulate relationships 484. The establishment of relationships 1105, 1110, 1115, 1120 can be automated, i.e., can occur without human intervention or approval at the time of establishment.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

A number of embodiments of the invention have been described. Nevertheless, it will be understood that various modifications may be made without departing from the spirit and scope of the invention. For example, a portion of the information accessible from the tag can be encoded in a non-public format to prevent the operator of a temporary system from gaining access to it. Accordingly, other embodiments are within the scope of the following claims.

What is claimed is:
1. A method for structuring a system, comprising:
receiving, at a data processing device, information characterizing a first article as having a first characteristic, wherein the information is received by interrogating a tag associated with the first article using an interrogation device;
accessing a machine-readable description of a system of articles, the system description comprising
a collection of data objects, each data object representing an article in the system, and
a collection of descriptions of relationships between the articles in the system;
the data processing device identifying a first relationship between a second article and a third article in the system of articles, wherein:
the second and the third article are represented by second and third data objects in the collection of data objects,
the second data object characterizes the second article as having the first characteristic, and
the first relationship characterizes one or more of a chemical interaction, an operational compatibility, and an electrical compatibility between the second article and the third article;
establishing a second relationship between the first article and the third article, the second relationship emulating the one or more of the chemical interaction, the operational compatibility, and the electrical compatibility between the second article and the third article, wherein establishing the second relationship comprises the data processing device writing the second relationship into the machine-readable description of a system of articles;
the data processing device identifying a third relationship between a fourth article and a fifth article in the system of articles, wherein:

the fourth and the fifth article are represented by fourth and fifth data objects in the collection, the fourth data object characterizes the fourth article as having the first characteristic, the third relationship characterizes one or more of a chemical interaction, an operational compatibility, and an electrical compatibility between the fourth article and the fifth article; and establishing a fourth relationship between the first article and the fifth article, the fourth relationship emulating the one or more of the chemical interaction, the operational compatibility, and the electrical compatibility between the fourth article and the fifth article, wherein establishing the fourth relationship comprises the data processing device writing the fourth relationship into the machine-readable description of a system of articles.

2. The method of claim 1, further comprising identifying the second data object in the collection of data objects based on the first characteristic of the first article and based on a second characteristic of the first article.

3. The method of claim 1, wherein the first characteristic is a category of the first article.

4. The method of claim 1, wherein the first characteristic is a functional characteristic of the first article.

5. The method of claim 1, further comprising creating a new first data object representing the first article.

6. The method of claim 1, further comprising adding the first data object to the collection of data objects in the system description.

7. The method of claim 1, wherein the first characteristic comprises information describing at least one of a make or a model of the first article.

8. A computer program product, tangibly embodied in one or more machine-readable data storage devices, for structuring a system, the computer program product being operable to cause one or more data processing apparatuses to perform operations, the operations comprising:

receiving information describing a first characteristic of a first article from a tag associated with the first article;

accessing a machine-readable description of a system of articles, the system description comprising
  a collection of descriptions that each describes articles in the system, and
  a collection of chemical interaction descriptions that each describe a chemical interaction between at least two articles in the system;

creating a new first description to represent the first article;

identifying a second description in the collection of descriptions, wherein the second description describes a second article in the system;

establishing a first chemical interaction description that describes a first chemical interaction involving the first article based on the second article sharing the first characteristic;

identifying a third description in the collection of descriptions, wherein the third description describes a third article in the system;

establishing a second chemical interaction description that describes a second chemical interaction involving the first article based on the third article sharing the first characteristic.

9. The computer program product of claim 8, wherein the operations further comprise establishing that the first article is new to the system of articles based on the information received from the tag.

10. The computer program product of claim 8, wherein the operations further comprise populating the first description with information received from the tag.

11. The computer program product of claim 8, wherein the first characteristic and the second characteristic are described in a description of a category of the first article.

12. The computer program product of claim 8, wherein the operations further comprise deploying the first article and other articles in the system without retrieving information regarding the first article from a separate database.

13. The computer program product of claim 8, wherein the descriptions that describe articles comprise data objects that represent articles.

14. The computer program product of claim 8, further comprising:

identifying a fourth description in the collection of descriptions, wherein the fourth description describes a fourth article in the system;

establishing an operational compatibility relationship description that describes operational compatibility of the first article based on the fourth article sharing the first characteristic.

15. The computer program product of claim 8, further comprising:

identifying a fourth description in the collection of descriptions, wherein the fourth description describes a fourth article in the system;

establishing a relationship indicating that the first article is a workpiece of the fourth article based on the fourth description.

16. A method for operating a system comprising
a collection of tangible articles each tagged with a machine-readable tag, the machine-readable tags storing machine-readable identification information, the machine-readable identification information identifying the tagged tangible articles,
an interrogation device configured to read machine-readable tags, and
a data storage device storing a collection of data objects, the data objects representing the tangible articles and describing characteristics of the tangible articles and relationships between the tangible articles, the method comprising:

interrogating a first tangible article using the interrogation device, the interrogation yielding information characterizing a first characteristic of the first tangible article;

identifying, in the collection, a data object representing a second tangible article, the data object describing that the second tangible article has the first characteristic and a relationship with a third tangible article in the collection;

identifying, in the collection, a data object representing a fourth tangible article, the data object describing that the fourth tangible article has the first characteristic and a relationship with a fifth tangible article in the collection;

adding a new data object to the collection of data objects to represent the first tangible article, the new data object describing relationships between the new data object and the third tangible article and the fifth tangible article.

17. The method of claim 16, wherein the first characteristic comprises a category of the first tangible article.

18. The method of claim 16, wherein adding the new data object to the collection comprises adding the new data object to describe that the first tangible article interacts chemically with the third tangible article.

19. The method of claim 16, wherein adding the new data object to the collection comprises adding the new data object to describe that the first tangible article is operationally compatible with the third tangible article.

20. The method of claim 16, wherein adding the new data object to the collection comprises adding the new data object to describe that the first tangible article interacts mechanically with the third tangible article.

* * * * *